United States Patent
Tamura et al.

(10) Patent No.: US 10,803,908 B1
(45) Date of Patent: Oct. 13, 2020

(54) SEALED ELECTRONIC COMPONENT REWORK PATCH

(71) Applicant: Western Digital Technologies, Inc., San Jose, CA (US)

(72) Inventors: Hitoshi Tamura, Ninomiya (JP); Takako Hayakawa, Hiratsuka (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/752,638

(22) Filed: Jan. 25, 2020

(51) Int. Cl.
*G11B 33/14* (2006.01)
*G11B 5/10* (2006.01)
*G11B 25/04* (2006.01)
*G11B 33/02* (2006.01)

(52) U.S. Cl.
CPC ............ *G11B 33/1466* (2013.01); *G11B 5/10* (2013.01); *G11B 5/102* (2013.01); *G11B 25/043* (2013.01); *G11B 33/027* (2013.01); *G11B 33/14* (2013.01); *G11B 33/1446* (2013.01)

(58) Field of Classification Search
None
See application file for complete search history.

(56) References Cited

U.S. PATENT DOCUMENTS

| | | | | |
|---|---|---|---|---|
| 4,859,491 | A * | 8/1989 | Yan | F17O 13/00 427/140 |
| 7,957,092 | B2 | 6/2011 | Ichikawa et al. | |
| 8,659,849 | B2 * | 2/2014 | Hayakawa | G11B 33/148 360/97.22 |
| 9,536,572 | B2 | 1/2017 | Lapp et al. | |
| 9,721,620 | B2 * | 8/2017 | Sudo | G11B 25/043 |
| 9,734,874 | B1 | 8/2017 | Choe et al. | |
| 9,786,330 | B1 * | 10/2017 | Usami | G11B 33/027 |
| 9,953,684 | B2 | 4/2018 | Albrecht et al. | |
| 10,079,043 | B2 | 9/2018 | Strange | |
| 10,134,448 | B2 * | 11/2018 | Albrecht | G11B 33/027 |
| 10,636,454 | B2 * | 4/2020 | Albrecht | G11B 25/043 |
| 2005/0068666 | A1 | 3/2005 | Albrecht et al. | |
| 2006/0034010 | A1 * | 2/2006 | Abe | G11B 33/1466 360/99.21 |
| 2007/0268621 | A1 | 11/2007 | Bernett et al. | |

FOREIGN PATENT DOCUMENTS

| | | |
|---|---|---|
| EP | 1903576 A2 | 3/2008 |
| JP | 2009097026 A | 5/2009 |

OTHER PUBLICATIONS

Aoyagi, Akihiko, Development of Helium Sealed High Capacity Hard Disk Drive, The Japan Society of Mechanical Engineers, the Information, Intelligence, Precision Equipment Division, 2016, 2 pages, downloaded from https://www.jsme.or.jp/award/jsme2016/mnt2016-1.pdf.

* cited by examiner

*Primary Examiner* — William J Klimowicz
(74) *Attorney, Agent, or Firm* — John D. Henkhaus

(57) ABSTRACT

Approaches to patching a leaky hermetically-sealed device include the use of a laminate rework patch that includes an adhesive tape layer, an aluminum sheet layer, and an outer cover layer, and whereby a viscous adhesive is injected or otherwise applied between the patch and the device leak location, over a layer of primer material, to fill the leak and stop the leakage of gas from inside the device. The thickness of the viscous adhesive, and thus the curing time and temperature of the viscous adhesive, can be managed by way of the thickness of the adhesive tape layer.

16 Claims, 5 Drawing Sheets

A - A

SEALED ELECTRONIC COMPONENT REWORK PATCH

FIELD OF EMBODIMENTS

Embodiments of the invention may relate generally to a hermetically sealed electronic device and particularly to a patch for reworking a leaking device.

BACKGROUND

A hard disk drive (HDD) is a non-volatile storage device that is housed in a protective enclosure and stores digitally encoded data on one or more circular disks having magnetic surfaces. When an HDD is in operation, each magnetic-recording disk is rapidly rotated by a spindle system. Data is read from and written to a magnetic-recording disk using a read-write head that is positioned over a specific location of a disk by an actuator. A read-write head makes use of magnetic fields to write data to and read data from the surface of a magnetic-recording disk. A write head works by using the current flowing through its coil to produce a magnetic field. Electrical pulses are sent to the write head, with different patterns of positive and negative currents. The current in the coil of the write head produces a localized magnetic field across the gap between the head and the magnetic disk, which in turn magnetizes a small area on the recording medium.

HDDs are being manufactured which are hermetically sealed with helium inside. Further, other gases that are lighter than air, such as hydrogen, nitrogen, etc., for non-limiting examples, have been contemplated for use as a replacement for air in sealed HDDs. There are various benefits to sealing and operating an HDD in helium ambient, for example, because the density of helium is one-seventh that of air. Hence, operating an HDD in helium reduces the drag force acting on the spinning disk stack, and the mechanical power used by the disk spindle motor is substantially reduced. Further, operating in helium reduces the flutter of the disks and the suspension, allowing for disks to be placed closer together and increasing the areal density (a measure of the quantity of information bits that can be stored on a given area of disk surface) by enabling a smaller, narrower data track pitch. The lower shear forces and more efficient thermal conduction of helium also mean the HDD will run cooler and will emit less acoustic noise. The reliability of the HDD is also increased due to low humidity, less sensitivity to altitude and external pressure variations, and the absence of corrosive gases or contaminants.

One approach to manufacturing a sealed HDD involves sealing a cover (typically a "second" cover) to an HDD enclosure base using laser welding, e.g., after all electrical functional tests are completed. However, while an HDD may pass the functional tests, the laser welding process does not yield leak-proof drives 100% of the time, due to leak path(s) that form around the welding bead. This could lead to having to scrap such a leaky HDD, and to the consequent and undesirable wasted costs and lost revenue.

Any approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

Embodiments are illustrated by way of example, and not by way of limitation, in the figures of the accompanying drawings and in which like reference numerals refer to similar elements and in which.

DETAILED DESCRIPTION

Approaches to a sealed hard disk drive rework patch are described. In the following description, for the purposes of explanation, numerous specific details are set forth in order to provide a thorough understanding of the embodiments of the invention described herein. It will be apparent, however, that the embodiments of the invention described herein may be practiced without these specific details. In other instances, well-known structures and devices are shown in block diagram form in order to avoid unnecessarily obscuring the embodiments of the invention described herein.

INTRODUCTION

The term "hermetic" will be understood to describe a sealing arrangement designed to have nominally no (or negligible) gaseous leakage or permeation paths. While terms such as "hermetic", "hermetically-sealed", "negligible leakage", "no leakage", etc. may be used herein, note that such a system would often still have a certain amount of permeability and, therefore, not be absolutely leak-free. Hence, the concept of a desired or target "leak rate" may be used herein.

The term "substantially" will be understood to describe a feature that is largely or nearly structured, configured, dimensioned, etc., but with which manufacturing tolerances and the like may in practice result in a situation in which the structure, configuration, dimension, etc. is not always or necessarily precisely as stated. For example, describing a structure as "substantially vertical" would assign that term its plain meaning, such that the sidewall is vertical for all practical purposes but may not be precisely at 90 degrees.

Figure 2:
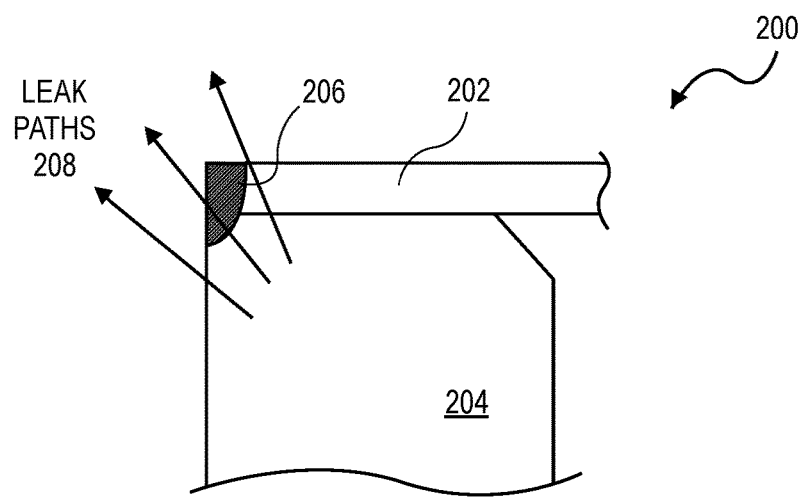
FIG. 2 is a cross-sectional side view illustrating a leaky sealed hard disk drive (HDD), according to an embodiment.

Recall that while a sealed HDD utilizing a second cover may pass its functional tests, the laser welding process does not usually yield leak-proof drives 100% of the time because of leak path(s) (e.g., helium, hydrogen, nitrogen, etc.) that may form around the welding bead. FIG. 2 is a cross-sectional side view illustrating a leaky sealed hard disk drive (HDD), according to an embodiment. HDD 200 comprises a cover 202 welded (e.g., laser welded) to an enclosure base part 204 via fusion material 206. As noted, leak paths 208 may form in the base part 204 and/or cover 202, such as by way of cracks, pits, spatter, sinks, metal improprieties, and the like.

Often, to plug such a leak path, laser welding may be applied a second time around the leak path. However, repeated welding may cause the HDD enclosure base to crack due to thermal stress created by the repeated welding procedures. Furthermore, such crack-type leak paths cannot be readily plugged or otherwise fixed by laser welding. Thus, a viable rework method is desirable for leaky "sealed" HDDs, especially those that have already passed functional testing, in order to help meet production specifications and reliability warranties, for example.

Laminate Rework Patch

Figure 3:
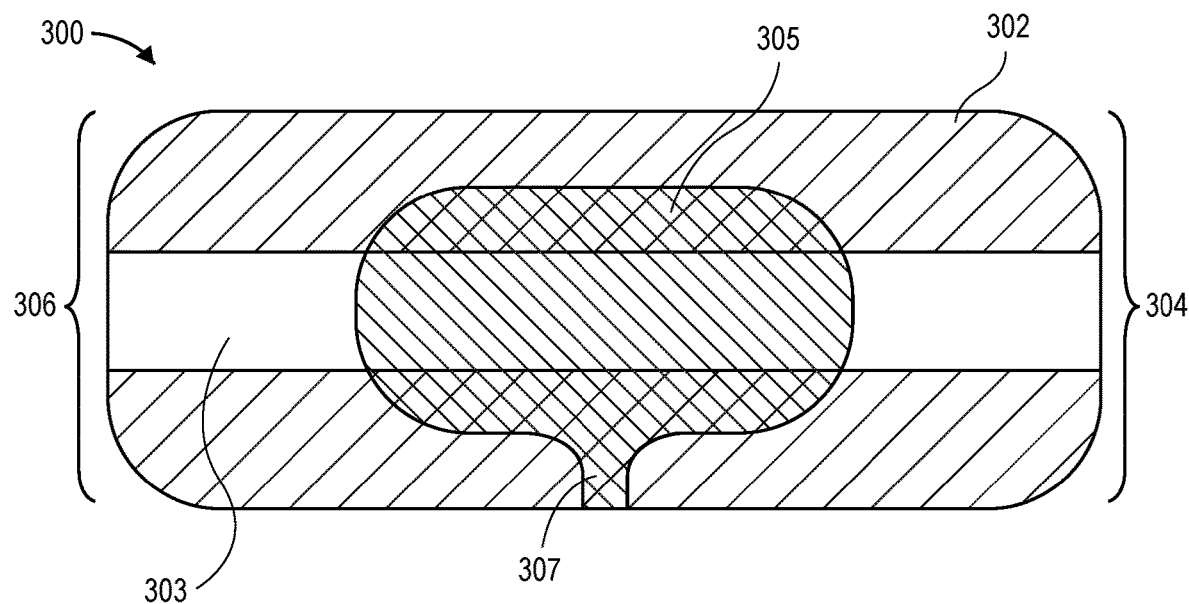
FIG. 3 includes a plan view illustrating a rework patch laminate, according to an embodiment.

FIG. 3 includes a plan view illustrating a rework patch laminate, according to an embodiment. A laminate rework patch 300 comprises an adhesive tape layer 302 configured to adhere each respective side or portion of the patch to the component being patched, for example a hermetically-sealed hard disk drive (HDD). Rework patch 300 further comprises an aluminum sheet layer 304 over the adhesive tape layer 302, and an outer cover layer 306 (according to an embodiment, polyethylene terephthalate (PET), a common thermoplastic polymer resin of the polyester family) over the aluminum sheet layer 304 and the adhesive tape layer 302. According to an embodiment, the adhesive tape layer 302 is positioned along each of two sides of the patch 300 (e.g., the upper and lower long sides, as depicted), with a trough 303 area between each side of the adhesive tape layer 302, the purpose of which is described in more detail elsewhere herein. Continuing with the foregoing embodiment, the aluminum sheet layer 304 and the outer cover layer 306 are each configured to cover the entire "footprint" or shape of the patch 300, including covering both sides of the adhesive tape layer 302.

The trough 303 formed along the length of the patch 300 between the "sides" of adhesive tape layer 302, which form a stepped structure down from the adhesive tape layer 302, functions or serves as a reservoir or pool volume 305 (depicted generally by way of example in FIG. 3, and referred to as "pool 305") for a viscous adhesive that can be injected into the pool 305, according to a patching process described in more detail elsewhere herein. Note that the shape, profile, and thickness, etc. of the pool 305 may vary from implementation to implementation based on, for example, the shape, condition, roughness, and the like of the surface(s) being patched.

Patch 300 further comprises a vent 307 structure formed and shaped for venting out excess viscous adhesive from the pool 305, i.e., from underneath the patch 300. Note that the ends of the trough 303 may also be used to vent out excess viscous adhesive from underneath the patch 300. Furthermore, according to an embodiment, the rework patch 300 may be configured symmetrically, whereby a similar vent structure as vent 307 is positioned on the opposing side, thereby forming viscous adhesive vents on each of the sides of the patch 300. Still further, the number of vent structures, in total or on a particular side of the patch 300, may vary from implementation to implementation.

Rework Patch Application

Figure 4A:
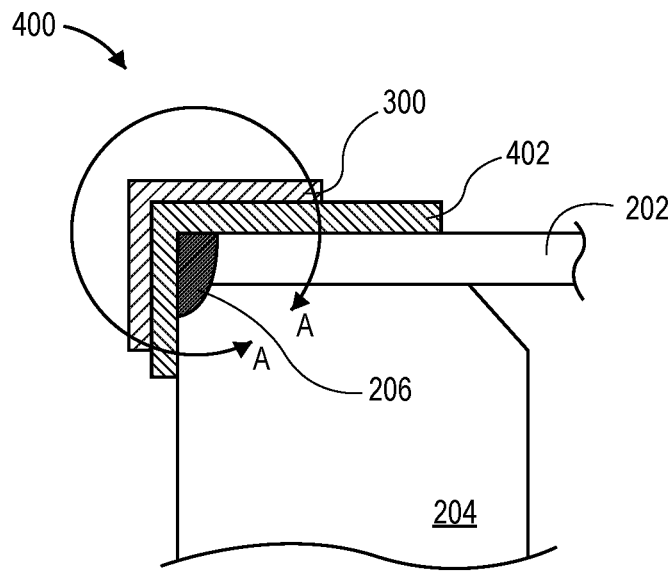
FIG. 4A is a cross-sectional side view illustrating a patched sealed hard disk drive (HDD), according to an embodiment.
Figure 4B:
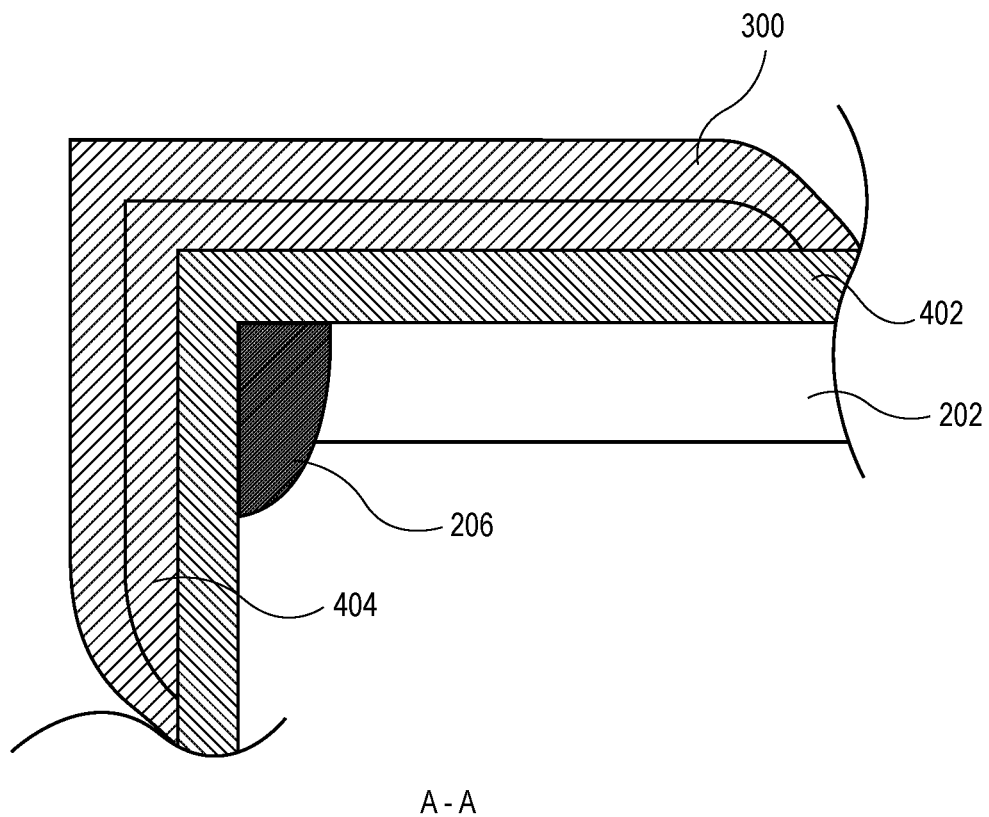
FIG. 4B is a magnified cross-sectional side view illustrating the patched sealed HDD of FIG. 4A, according to an embodiment.

FIG. 4A is a cross-sectional side view illustrating a patched sealed hard disk drive (HDD), and FIG. 4B is a magnified cross-sectional side view illustrating the patched sealed HDD of FIG. 4A, according to an embodiment. Note that the target use or application of the patching materials and processes described herein is for laser-welding-caused types of cracks/leakages described elsewhere herein, rather than for all hermetically-sealed HDDs, generally. However, other uses for the patching materials and processes described herein may be implemented, while still falling within the scope of the claimed subject matter.

Patched HDD 400 is depicted similarly as leaky HDD 200 (FIG. 2), but patched according to embodiments. That is, HDD 200 comprises the cover 202 welded (e.g., laser welded) to an enclosure base part 204 via fusion material 206, with leak paths 208 patched with a rework patch such as patch 300 (FIG. 3). By contrast, however, patched HDD 400 comprises a layer of priming material or primer 402 applied to (e.g., "painted" onto) a portion of the cover 202 (e.g., a second cover for hermetically sealing, over a conventional first cover of a conventional HDD) and a portion of the enclosure base part 204. Primer 402 serves to prevent corrosion at least of the cover 202, assists in the curing at room temperature of a viscous adhesive 404 in contact therewith, as well as providing a relatively higher barrier to moisture migration into the component through the leak location. Room temperature curing consequently prevents internal components of HDD 400 (e.g., the voice-coil motor, read-write heads, etc.) from thermal damage that might otherwise occur by a high temperature curing procedure. Suitable primer materials should be considered based on, for example, their compatibility with the viscous adhesive 404 used and the type of metal (e.g., metal of cover 202 and/or base part 204) on which the primer 402 is applied.

Figure 5A:
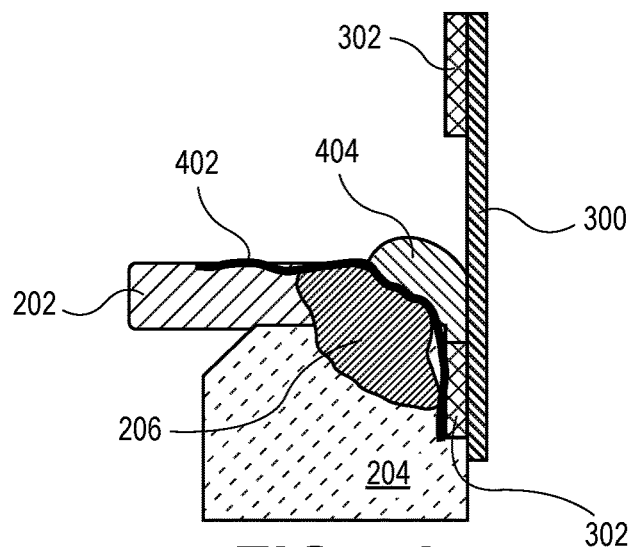
FIGS. 5A-5C are cross-sectional side views illustrating an application process for a rework patch, according to an embodiment.
Figure 5B:
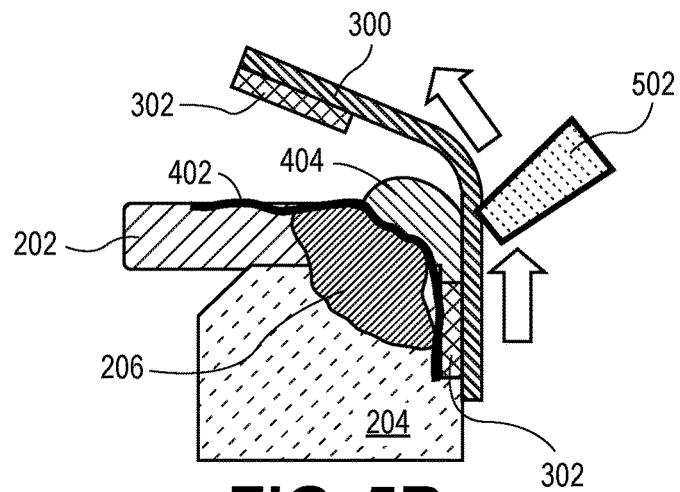
Figure 5C:
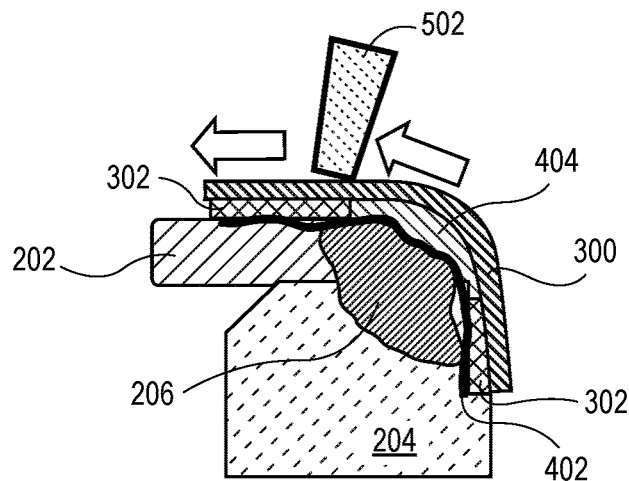

FIGS. 5A-5C are cross-sectional side views illustrating an application process for a rework patch, according to an embodiment. According to an embodiment, a rework patch 300 may be partially adhered (e.g., via a bottom/first portion of adhesive layer 302 of FIG. 3) over the primer 402 to the cover 202 or the enclosure base part 204 (depending on from which side the operator chooses to start) to cover the leak, then a viscous adhesive 404 is injected or otherwise inserted or applied between the patch 300 and the component (e.g., into the pool 305 of FIG. 3), then the other side of the patch 300 is adhered to the component (e.g., via the top/second portion of adhesive layer 302 of FIG. 3), while or after which any surplus adhesive 404 is removed (e.g., via the vent 307 of FIG. 3), such as by using a tool such as a scraper 502, and then the adhesive 404 is allowed to cure, thereby plugging/repairing the leak.

Method of Patching a Leak in a Hermetically-Sealed Component

Figure 6:
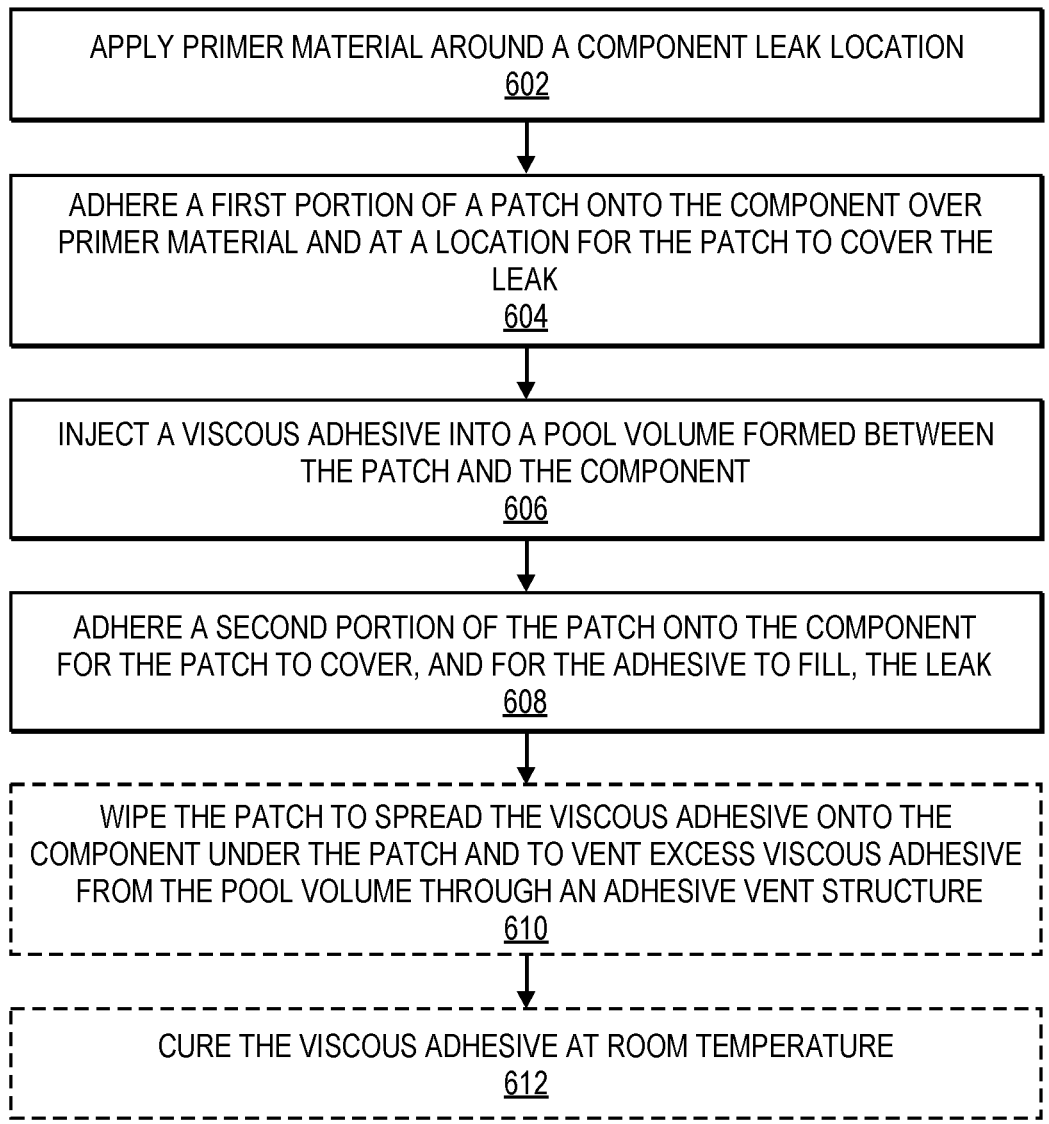
FIG. 6 is a flow diagram illustrating a method of patching a leak in a hermetically-sealed electronic component.

FIG. 6 is a flow diagram illustrating a method of patching a leak in a hermetically-sealed electronic component.

At block 602, a primer material is applied on and around a component leak location. For example, primer 402 (FIGS. 4A-5C) is applied to (e.g., "painted" onto) a portion of the cover 202 (FIGS. 4A-5C) and a portion of the enclosure base part 204 (FIGS. 4A-5C).

At block 604, a first portion of a patch is adhered onto the component over at least a portion of the primer material and at a location for the patch to cover the leak. For example, rework patch 300 (FIGS. 3-5C) is partially adhered (e.g., via a bottom/first portion of adhesive layer 302 of FIG. 3) over the primer 402 to the enclosure base part 204, to begin to cover the leak location.

At block 606, a viscous adhesive in injected into a pool volume formed between the patch and the component. For example, the viscous adhesive 404 (FIGS. 4B-5C) is injected or otherwise inserted or applied between the patch 300 (e.g., under the aluminum sheet layer 304) and the component (e.g., into the pool 305 formed by the stepped adhesive tape layer 302 in the patch 300, of FIG. 3).

According to an embodiment, the viscous adhesive has a viscosity less than 1 Pa-s (Pascal-second), to maximize the capillary action efficacy of the viscous adhesive, e.g., especially in view of relatively narrow leak paths. For a non-limiting example, an acrylic resin type of adhesive may be used as the viscous adhesive 404.

At block 608, a second portion of the patch is adhered onto the component for the patch to now cover, and for the adhesive to fill, the leak. For example, the other side of the patch 300 is adhered to the component (e.g., via the top/second portion of adhesive layer 302 of FIG. 3) over the primer 402 to the cover 202, to finish covering the leak location.

According to an embodiment, at optional block 610, the patch is wiped to spread the viscous adhesive onto the component, under the patch, and to vent excess viscous adhesive from the pool volume, through an adhesive vent structure. For example, concurrent with, or after which, the second portion of the patch 300 is adhered onto the component, any surplus adhesive 404 is removed via the vent 307 (FIG. 3), such as by using a tool such as a scraper 502 (FIGS. 5A-5C). According to an embodiment, the adhesive tape layer 302 of rework patch 300 is less than 50 μm (micrometers), thereby enabling a thickness of the viscous adhesive 404 to be likewise less than 50 μm (micrometers), which enables a desirable management and control over the cure time (e.g., at least 3 hours) of the viscous adhesive 404. However, the thickness of the adhesive tape layer 302 and the corresponding viscous adhesive 404 may vary from implementation to implementation based, for example, on the composition of the viscous adhesive 404, the thickness of the layer of applied primer 402, and the like. Thus, the thickness of the adhesive tape layer 302 and the corresponding viscous adhesive 404 may exceed 50 μm, but with consideration to thinner materials/application likely enabling better prevention of moisture migration into the component being patched.

According to an embodiment, at optional block 612, the viscous adhesive is cured at room temperature. For example, the adhesive 404 is allowed to cure, at room temperature (thereby avoiding the need for manufacturing equipment investment, and avoiding internal component damage due to curing with heat), thereby plugging/repairing the leak.

The foregoing approaches to reworking/patching a leaky sealed electronic component such as a hermetically-sealed HDD are considered suitable for patching variable leak paths, such as what has been found to occur with, but not limited to, HDD's that leak fail after multiple laser welds associated with the second cover to the enclosure base. This is in contrast to what may be considered conventional sealed HDD production techniques that may utilize (i) a simple adhesive/aluminum tape to cover the second cover/base joint (which may not be considered reliable due to inadequate adhesive force and relative ease of moisture entering/migrating into the HDD), (ii) a simple liquid adhesive alone applied between the second cover and base (which may require additional curing time or higher temperature curing and which may not be considered reliable due to different coefficients of thermal expansion of the adhesive and mating metals), and (iii) a combination of the foregoing, whereby a liquid adhesive is applied between the second cover and base and then a tape is used to cover the second cover/base joint. Overall, the approaches described herein are considered to require scrapping of fewer units, hence, saving the cost of failed/scrapped units.

Physical Description of an Illustrative Operating Context

Embodiments may be used in the context of a hermetically-sealed electronic component, such as a hermetically-sealed hard disk drive (HDD). Thus, in accordance with an embodiment, a plan view illustrating an HDD 100 is shown in FIG. 1 to illustrate an exemplary operating context.

Figure 1:
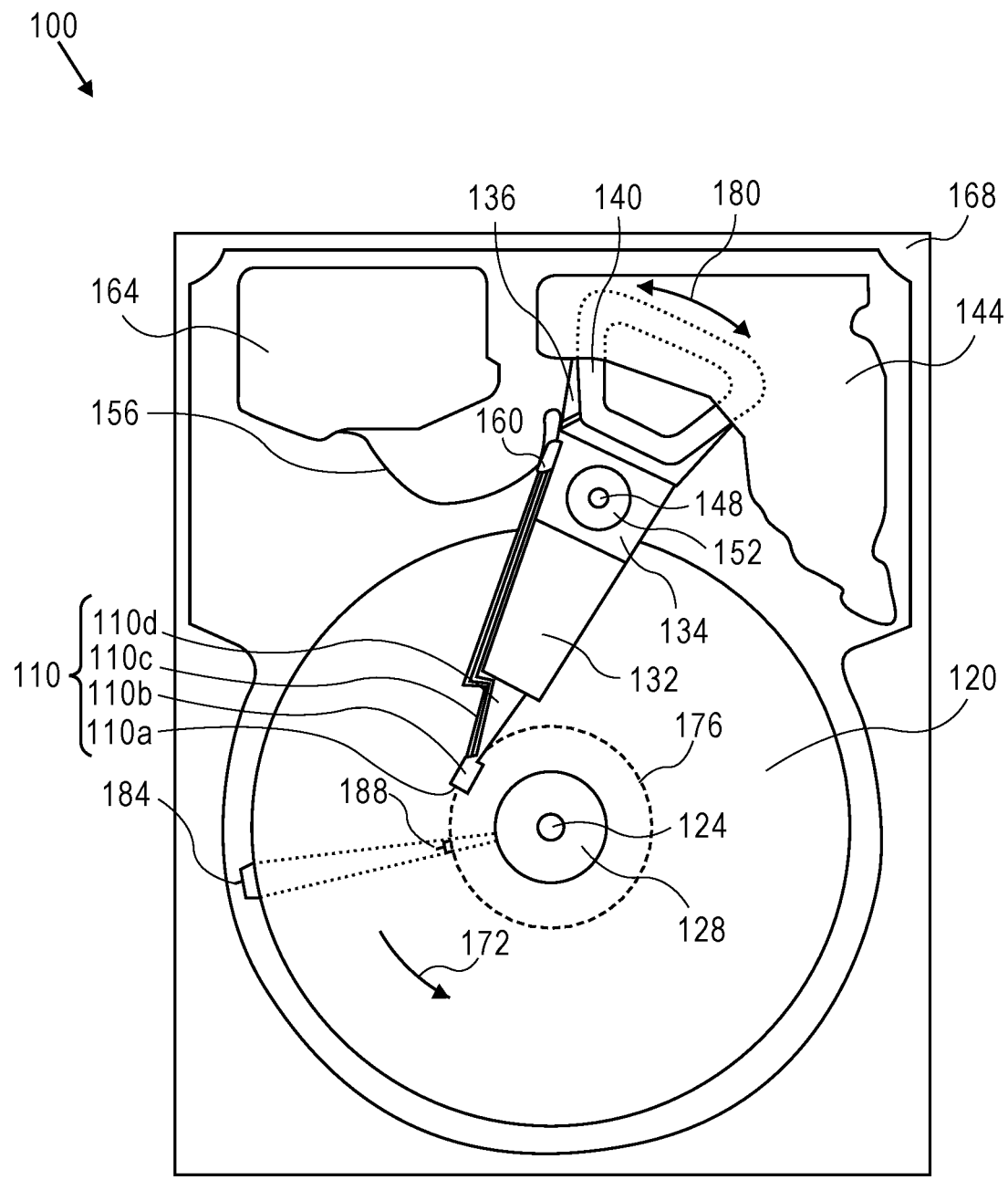
FIG. 1 is a plan view illustrating a hard disk drive (HDD), according to an embodiment.

FIG. 1 illustrates the functional arrangement of components of the HDD 100 including a slider 110b that includes a magnetic read-write head 110a. Collectively, slider 110b and head 110a may be referred to as a head slider. The HDD 100 includes at least one head gimbal assembly (HGA) 110 including the head slider, a lead suspension 110c attached to the head slider typically via a flexure, and a load beam 110d attached to the lead suspension 110c. The HDD 100 also includes at least one recording medium 120 rotatably mounted on a spindle 124 and a drive motor (not visible) attached to the spindle 124 for rotating the medium 120. The read-write head 110a, which may also be referred to as a transducer, includes a write element and a read element for respectively writing and reading information stored on the medium 120 of the HDD 100. The medium 120 or a plurality of disk media may be affixed to the spindle 124 with a disk clamp 128.

The HDD 100 further includes an arm 132 attached to the HGA 110, a carriage 134, a voice-coil motor (VCM) that includes an armature 136 including a voice coil 140 attached to the carriage 134 and a stator 144 including a voice-coil magnet (not visible). The armature 136 of the VCM is attached to the carriage 134 and is configured to move the arm 132 and the HGA 110 to access portions of the medium 120, all collectively mounted on a pivot shaft 148 with an interposed pivot bearing assembly 152. In the case of an HDD having multiple disks, the carriage 134 may be referred to as an "E-block," or comb, because the carriage is arranged to carry a ganged array of arms that gives it the appearance of a comb.

An assembly comprising a head gimbal assembly (e.g., HGA 110) including a flexure to which the head slider is coupled, an actuator arm (e.g., arm 132) and/or load beam to which the flexure is coupled, and an actuator (e.g., the VCM) to which the actuator arm is coupled, may be collectively referred to as a head stack assembly (HSA). An HSA may, however, include more or fewer components than those described. For example, an HSA may refer to an assembly that further includes electrical interconnection components. Generally, an HSA is the assembly configured to move the head slider to access portions of the medium 120 for read and write operations.

With further reference to FIG. 1, electrical signals (e.g., current to the voice coil 140 of the VCM, and a write signal to and a read signal from the head 110a) are transmitted by a flexible cable assembly (FCA) 156 (or "flex cable"), also at times referred to as a flexible printed circuit (FPC). Interconnection between the flex cable 156 and the head 110a may include an arm-electronics (AE) module 160, which may have an on-board pre-amplifier for the read signal, as well as other read-channel and write-channel electronic components. The AE module 160 may be attached to the carriage 134 as shown. The flex cable 156 may be coupled to an electrical-connector block 164, which provides electrical communication, in some configurations, through an electrical feed-through provided by an HDD housing 168. The HDD housing 168 (or "enclosure base" or "baseplate" or simply "base"), in conjunction with an HDD cover, provides a semi-sealed (or hermetically sealed, in some configurations) protective enclosure for the information storage components of the HDD 100.

Other electronic components, including a disk controller and servo electronics including a digital-signal processor (DSP), provide electrical signals to the drive motor, the voice coil 140 of the VCM and the head 110a of the HGA 110. The electrical signal provided to the drive motor enables the drive motor to spin providing a torque to the spindle 124 which is in turn transmitted to the medium 120 that is affixed to the spindle 124. As a result, the medium 120 spins in a direction 172. The spinning medium 120 creates a cushion of air that acts as an air-bearing on which the air-bearing surface (ABS) of the slider 110b rides so that the slider 110b flies above the surface of the medium 120 without making contact with a thin magnetic-recording layer in which information is recorded. Similarly in an HDD in which a lighter-than-air gas is utilized, such as helium or hydrogen for non-limiting examples, the spinning medium 120 creates a cushion of gas that acts as a gas or fluid bearing on which the slider 110b rides.

The electrical signal provided to the voice coil 140 of the VCM enables the head 110a of the HGA 110 to access a track 176 on which information is recorded. Thus, the armature 136 of the VCM swings through an arc 180, which enables the head 110a of the HGA 110 to access various tracks on the medium 120. Information is stored on the medium 120 in a plurality of radially nested tracks arranged in sectors on the medium 120, such as sector 184. Correspondingly, each track is composed of a plurality of sectored track portions (or "track sector") such as sectored track portion 188. Each sectored track portion 188 may include recorded information, and a header containing error correction code information and a servo-burst-signal pattern, such as an ABCD-servo-burst-signal pattern, which is information that identifies the track 176. In accessing the track 176, the read element of the head 110a of the HGA 110 reads the servo-burst-signal pattern, which provides a position-error-signal (PES) to the servo electronics, which controls the electrical signal provided to the voice coil 140 of the VCM, thereby enabling the head 110a to follow the track 176. Upon finding the track 176 and identifying a particular sectored track portion 188, the head 110a either reads information from the track 176 or writes information to the track 176 depending on instructions received by the disk controller from an external agent, for example, a microprocessor of a computer system.

An HDD's electronic architecture comprises numerous electronic components for performing their respective functions for operation of an HDD, such as a hard disk controller ("HDC"), an interface controller, an arm electronics module, a data channel, a motor driver, a servo processor, buffer memory, etc. Two or more of such components may be combined on a single integrated circuit board referred to as a "system on a chip" ("SOC"). Several, if not all, of such electronic components are typically arranged on a printed circuit board that is coupled to the bottom side of an HDD, such as to HDD housing 168.

References herein to a hard disk drive, such as HDD 100 illustrated and described in reference to FIG. 1, may encompass an information storage device that is at times referred to as a "hybrid drive". A hybrid drive refers generally to a storage device having functionality of both a traditional HDD (see, e.g., HDD 100) combined with solid-state storage device (SSD) using non-volatile memory, such as flash or other solid-state (e.g., integrated circuits) memory, which is electrically erasable and programmable. As operation, management and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Further, a hybrid drive may be architected and configured essentially as two storage devices in a single enclosure, i.e., a traditional HDD and an SSD, with either one or multiple interfaces for host connection.

EXTENSIONS AND ALTERNATIVES

In the foregoing description, embodiments of the invention have been described with reference to numerous specific details that may vary from implementation to implementation. Therefore, various modifications and changes may be made thereto without departing from the broader spirit and scope of the embodiments. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

In addition, in this description certain process steps may be set forth in a particular order, and alphabetic and alphanumeric labels may be used to identify certain steps. Unless specifically stated in the description, embodiments are not necessarily limited to any particular order of carrying out such steps. In particular, the labels are used merely for convenient identification of steps, and are not intended to specify or require a particular order of carrying out such steps.

What is claimed is:

1. A method of patching a leak in a hermetically-sealed electronic component, the method comprising:
    applying primer material on and around a component leak location;
    adhering a first portion of a patch onto the component over primer material and at a location for the patch to cover the leak;
    injecting a viscous adhesive into a pool volume formed between the patch and the component; and
    adhering a second portion of the patch onto the component for the patch to cover and for the adhesive to fill the leak.

2. The method of claim 1, wherein the patch is a laminate composition comprising:
    an adhesive tape layer configured to adhere the first portion and the second portion of the patch to the component,
    an aluminum sheet layer, and
    an outer cover layer.

3. The method of claim 2, wherein injecting the adhesive includes injecting the viscous adhesive into the pool volume formed between the aluminum sheet layer of the patch and the component.

4. The method of claim 2, wherein the patch further comprises an adhesive vent structure formed in the adhesive tape layer and configured to allow some of the viscous adhesive to exit the pool volume.

5. The method of claim 4, further comprising:
wiping the patch to spread the viscous adhesive onto the component under the patch and to vent excess viscous adhesive from the pool volume through the adhesive vent structure.

6. The method of claim 2, wherein a thickness of the adhesive tape layer of the patch is less than 50 μm (micrometers), the method further comprising:
wiping the patch to spread the viscous adhesive onto the component under the patch and to vent excess viscous adhesive from the pool volume through an adhesive vent structure; and
curing the viscous adhesive at a thickness less than 50 μm (micrometers).

7. The method of claim 1, further comprising:
wiping the patch to spread the viscous adhesive onto the component under the patch and to vent excess viscous adhesive from the pool volume through an adhesive vent structure; and
curing the viscous adhesive at room temperature.

8. The method of claim 1, wherein injecting the viscous adhesive comprises injecting an adhesive having a viscosity less than 1 Pa-s (pascal-second) to maximize capillary action efficacy of the viscous adhesive.

9. A hermetically-sealed hard disk drive product produced according to the method of claim 1.

10. A hermetically-sealed data storage device hermetically-patched with a patch, the data storage device comprising:
an enclosure base assembly comprising an enclosure base part and having a leak hermetically-patched with the patch;
a primer applied to the enclosure base part over the leak;
the patch adhered over at least a portion of the primer, wherein the patch is a laminate composition comprising:
an adhesive tape layer configured to adhere to the enclosure base part,
an aluminum sheet layer over the adhesive tape layer, and
an outer cover layer over the aluminum sheet layer; and
a viscous adhesive spread between the patch and the enclosure base part, and at least in part filling the leak, thereby stopping leakage of gas from the leak from inside the base assembly.

11. The data storage device of claim 10, wherein the patch further comprises an adhesive vent structure formed in the adhesive tape layer and configured to allow some of the viscous adhesive to exit a pool volume formed between the aluminum sheet layer and the enclosure base part.

12. The data storage device of claim 10, further comprising:
a second cover laser welded to the enclosure base part over a first cover; and
wherein the leak is formed in a laser weld bead attaching the second cover to the enclosure base part.

13. The data storage device of claim 10, wherein the leak is formed in the enclosure base part of the enclosure base assembly.

14. The data storage device of claim 10, wherein:
a thickness of the adhesive tape layer of the patch is less than 50 μm (micrometers); and
a thickness of the viscous adhesive is less than 50 μm (micrometers).

15. The data storage device of claim 10, wherein the outer cover layer is composed of polyethylene terephthalate (PET).

16. A hermetically-sealed data storage device, comprising:
means for preparing a material of which an enclosure base part is composed, over a leak location, for assisting with curing a means for adhering;
means for covering the leak location, for assisting with filling the leak with the means for adhering, including means for venting excess means for adhering; and
the means for adhering applied into a volume formed between the means for covering and the enclosure base part.

* * * * *